(12) United States Patent
Betancourt et al.

(10) Patent No.: US 11,871,443 B1
(45) Date of Patent: Jan. 9, 2024

(54) PUBLIC STEWARDSHIP ENTITY WIRELESS COMMUNICATION NETWORK PORTAL

(71) Applicant: T-MOBILE INNOVATIONS LLC, Overland Park, KS (US)

(72) Inventors: Miguel Angel Villavicencio Betancourt, Ocoee, FL (US); Justin Kolnick, Ocala, FL (US); Shane A. Lobo, Ponte Vedra, FL (US); Brian D. Lushear, Winter Springs, FL (US); Tyler Matthews, Orlando, FL (US); Paul Andrew Shinholster, Jr., Orlando, FL (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 692 days.

(21) Appl. No.: 16/875,406

(22) Filed: May 15, 2020

(51) Int. Cl.
| | |
|---|---|
| *H04W 72/00* | (2023.01) |
| *H04L 67/306* | (2022.01) |
| *H04L 45/302* | (2022.01) |
| *H04W 4/90* | (2018.01) |
| *H04W 36/30* | (2009.01) |
| *H04W 40/12* | (2009.01) |
| *H04W 40/36* | (2009.01) |
| *H04W 72/566* | (2023.01) |

(52) U.S. Cl.
CPC ......... *H04W 72/566* (2023.01); *H04L 45/308* (2013.01); *H04L 67/306* (2013.01); *H04W 4/90* (2018.02); *H04W 36/305* (2018.08); *H04W 40/12* (2013.01); *H04W 40/36* (2013.01)

(58) Field of Classification Search
None
See application file for complete search history.

(56) References Cited

U.S. PATENT DOCUMENTS

| 10,952,270 | B1* | 3/2021 | Sung | H04W 88/08 |
|---|---|---|---|---|
| 2004/0095954 | A1* | 5/2004 | Varney | H04W 4/00 |
| | | | | 370/444 |
| 2008/0144528 | A1* | 6/2008 | Graves | H04W 24/02 |
| | | | | 370/254 |
| 2012/0275391 | A1* | 11/2012 | Cui | H04W 72/1247 |
| | | | | 370/329 |

(Continued)

*Primary Examiner* — Chirag G Shah
*Assistant Examiner* — Suk Jin Kang

(57) ABSTRACT

A method of monitoring a wireless communication network and managing priority uplift for mobile communication devices of public stewardship workers. The method comprises receiving operations data by a public stewardship entity network portal application executing on a computer system, where the operations data is about a plurality of cell sites in a wireless communication network, receiving an input by the public stewardship entity network portal application from the user interface of the public stewardship entity network portal application identifying a location of a public stewardship event, determining by the public stewardship entity network portal application based on the operations data that wireless communication service of at least one cell site proximate to the location of the public stewardship event is impaired, and uplifting by the public stewardship entity network portal application the priority of mobile communication devices of public stewardship workers dispatched to respond to the public stewardship event.

20 Claims, 13 Drawing Sheets

(56) References Cited

U.S. PATENT DOCUMENTS

| | | | |
|---|---|---|---|
| 2014/0280937 A1* | 9/2014 | Miller | H04L 47/20 709/225 |
| 2015/0281934 A1* | 10/2015 | Kawaguchi | H04W 4/02 370/259 |
| 2018/0184236 A1* | 6/2018 | Faraone | H04W 8/186 |
| 2020/0151841 A1* | 5/2020 | Schuler | G06Q 50/265 |
| 2020/0365008 A1* | 11/2020 | Sjölund | H04W 4/90 |
| 2020/0404474 A1* | 12/2020 | Artuso | H04W 4/90 |
| 2021/0037368 A1* | 2/2021 | Pellegrini | H04W 4/90 |
| 2021/0182084 A1* | 6/2021 | Fariss | H04M 3/5116 |
| 2021/0266722 A1* | 8/2021 | Pellegrini | G06F 16/29 |
| 2021/0289416 A1* | 9/2021 | Shurtz | H04W 40/02 |
| 2022/0159441 A1* | 5/2022 | Aminaka | H04W 28/02 |
| 2022/0159560 A1* | 5/2022 | Yanai | H04M 3/42 |

\* cited by examiner

PUBLIC STEWARDSHIP ENTITY WIRELESS COMMUNICATION NETWORK PORTAL

CROSS-REFERENCE TO RELATED APPLICATIONS

None

STATEMENT REGARDING FEDERALLY SPONSORED RESEARCH OR DEVELOPMENT

Not applicable.

REFERENCE TO A MICROFICHE APPENDIX

Not applicable.

BACKGROUND

Public stewardship workers may be government works such as paramedics, ambulance crews, fire fighters, law enforcement officers, forest service workers, environmental protection agency workers, coast guard members, national guard members, military service members, and others. Public stewardship workers may use mobile communications devices that receive wireless communication service from cell sites and a supporting network infrastructure to perform their duties, for example to provide mutual aid to each other, to manage an emergency, and to coordinate a response to an emergency.

SUMMARY

In an embodiment, a method of monitoring a wireless communication network and managing priority uplift for mobile communication devices of public stewardship workers is disclosed. The method comprises receiving operations data by a public stewardship entity network portal application executing on a computer system, where the operations data is about a plurality of cell sites in a wireless communication network, receiving an input by the public stewardship entity network portal application from a user interface of the public stewardship entity network portal application selecting a geographic location and selecting a geographic scale, and presenting a wireless communication network status map by the public stewardship entity network portal application based on the operations data, where the wireless communication network status map indicates an operating status of cell sites among the plurality of cell sites in the wireless communication network that are located in an area defined by the selected geographic location and the selected geographic scale. The method further comprises receiving an input by the public stewardship entity network portal application from the user interface of the public stewardship entity network portal application identifying a location of a public stewardship event, determining by the public stewardship entity network portal application based on the operations data that wireless communication service of at least one cell site proximate to the location of the public stewardship event is impaired, and, based on the determination that wireless communication service of at least one cell site proximate to the location of the public stewardship event is impaired, uplifting by the public stewardship entity network portal application the priority of mobile communication devices of public stewardship workers dispatched to respond to the public stewardship event.

In another embodiment, a method of monitoring a wireless communication network and controlling wireless frequencies used by mobile communication devices of public stewardship workers is disclosed. The method comprises receiving operations data by a public stewardship entity network portal application executing on a computer system, where the operations data is about a plurality of cell sites in a wireless communication network; receiving an input by the public stewardship entity network portal application from a user interface of the public stewardship entity network portal application selecting a geographic location and selecting a geographic scale, and presenting a wireless communication network status map by the public stewardship entity network portal application based on the operations data, where the wireless communication network status map indicates an operating status of cell sites among the plurality of cell sites in the wireless communication network that are located in an area defined by the selected geographic location and the selected geographic scale. The method further comprises receiving an input by the public stewardship entity network portal application from the user interface of the public stewardship entity network portal application selecting an event type mapping overlay, retrieving event information by the public stewardship entity network portal application from a web server associated with the selected event type mapping overlay, and presenting event information by the public stewardship entity network portal application overlaid on the wireless communication network status map according to the input geographic scale and input geographic location. The method further comprises determining a preferred wireless communication frequency band by the public stewardship entity network portal application based on the operations data of some of the plurality of cell sites and based on the event information and transmitting a command to communicate using the preferred wireless communication frequency band by the public stewardship entity network portal application to at least one mobile communication device associated with a public stewardship worker.

In yet another embodiment, a method of monitoring a wireless communication network used by mobile communication devices of public stewardship workers is disclosed. The method comprises receiving data about a plurality of cell sites in a wireless communication network by a public stewardship entity network portal application executing on a computer system, receiving an input by the public stewardship entity network portal application from a user interface of the public stewardship entity network portal application selecting a geographic location and selecting a geographic scale, and adapting the data about cell sites located within an area defined by the selected geographic location and the selected geographic scale by the public stewardship entity network portal application to make the adapted data meaningful to a public stewardship dispatcher. The method further comprises presenting a wireless communication network status map by the public stewardship entity network portal application based on the adapted data, where the wireless communication network status map indicates an operating status of cell sites located within the area defined by the selected geographic location and the selected geographic scale, receiving an input by the public stewardship entity network portal application from the user interface of the public stewardship entity network portal application selecting an event type mapping overlay, retrieving event information by the public stewardship entity network portal application from a web server associated with the selected event type mapping overlay, and presenting event information associated with the area defined by the selected geographic location and the selected geographic scale by the public stewardship entity network portal application overlaid on the wireless communication network status map.

In yet another embodiment, a public stewardship entity wireless communication network portal is disclosed. The portal comprises a processor, a non-transitory memory, and a public stewardship entity network portal application stored in the non-transitory memory. When executed by the processor, the public stewardship entity network portal application receives operations data about a plurality of cell sites in a wireless communication network, receives an input selecting a geographic location and selecting a geographic scale, and presents a wireless communication network status map based on the operations data, where the wireless communication network status map indicates an operating status of cell sites located within the area defined by the selected geographic location and the selected geographic scale. When executed by the processor, the public stewardship entity network portal application further receives an input selecting an event type mapping overlay, retrieves event information from a web server associated with the selected event type mapping overlay, and presents event information associated with the area defined by the selected geographic location and the selected geographic scale overlaid on the wireless communication network status map. When executed by the processor, the public stewardship entity network portal application further receives an input selecting an event icon overlaid on the wireless communication network status map, retrieves detail event information associated with the selected event icon from the web server associated with the selected event type mapping overlay, and presents details associated with the event icon overlaid on the wireless communication network status map.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
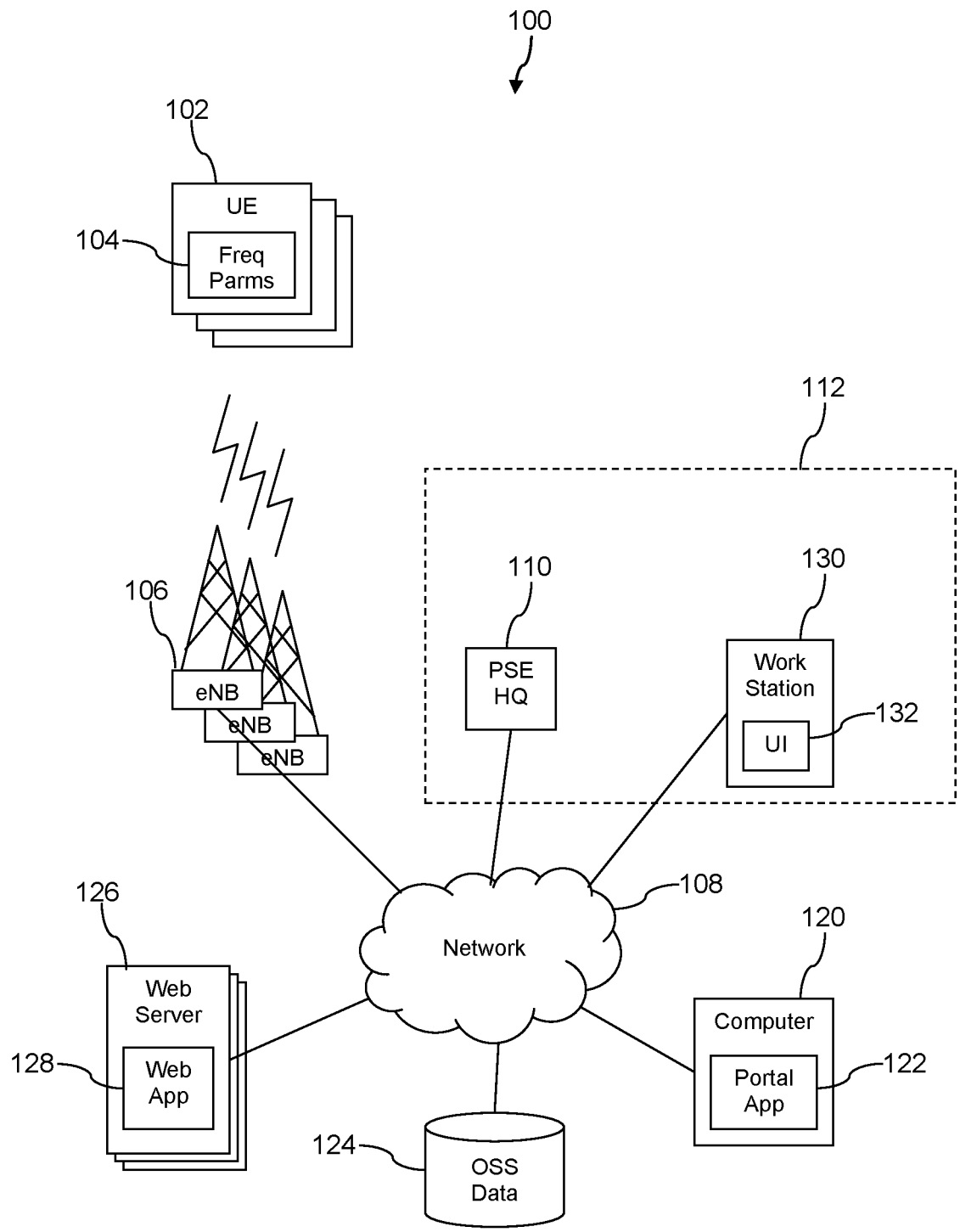
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Public stewardship workers may use mobile communication devices (e.g., cell phones, mobile phones, personal digital assistants (PDAs), smart phones, an Internet of things (IoT) device, laptop computers, tablet computers, notebook computers, wearable computers, headset computers, and the like) to communicate with each other and with a public stewardship entity headquarters or dispatching center while responding to public stewardship events. For example, public stewardship workers may use the mobile communication devices to provide mutual aid to each other, to manage a public stewardship event, and to coordinate a response to the public stewardship event. A wireless communication network may be impacted by the very event that the public stewardship worker is responding to, for example a wild fire or a flood. It is desirable for a public stewardship dispatcher to understand the status of the wireless communication network that provides service to the mobile communication devices before the public stewardship workers are dispatched to respond to an event. The present disclosure teaches a public stewardship entity (PSE) wireless communication network portal that provides actionable and understandable wireless communication network status information to public stewardship entities. Public stewardship workers may be paramedics, ambulance crews, fire fighters, law enforcement officers, forest service workers, environmental protection agency workers, coast guard members, national guard members, military service members, and others. Generally, public stewardship workers work for a public organization such as the United States government, a state government, a county government, or a city government, and their duties generally involve some kind of stewardship or custodial role to promote the interests, safety, and/or security of the public.

The PSE network portal may be used by public stewardship entities to (1) evaluate wireless communication service in an area of interest (a location of a fire or other public stewardship event location) and to (2) uplift priority for specific mobile communication devices. The portal leverages operational support system (OSS) data to provide a zoomable view of radio access network (RAN) status based on a national map. Knowing the status of the wireless communication service in a public stewardship event location can enable a public stewardship dispatcher to formulate appropriate plans and orders for the public stewardship workers. Being able to uplift priority (e.g., giving precedence in obtaining limited wireless communication network resources such as radio channel and/or data bandwidth) of the mobile communication devices of public stewardship workers may promote the public stewardship worker receiving communication service they need notwithstanding wireless communication traffic congestion.

The PSE network portal takes the OSS data, digests that data, and presents the data appropriately to users. For example, the PSE network portal may adapt the data by simplifying it for use by a non-technical user (e.g., a person who is not expert in telecommunications protocols and technical metrics that wireless communication service provider technicians may desire to see when themselves monitoring and maintaining the wireless network from a network operations center (NOC)). The PSE network portal restricts the information that is shared from the OSS and may adapt some of the status information to make it useful and meaningful to non-technical users. The PSE network portal, when zoomed in, depicts cell sites and can indicate an operational status by graphic coding and/or by color coding.

The user can select one or more event overlays to be displayed superimposed on the map such as areas of active wild fires, fire weather watch, flooding, frost advisory, electric power distribution outages, and other event conditions. The information presented in the form of such event overlays may be obtained from public information web sites via an application programming interface (API) extended by a web server, for example a web server maintained by the US government, by other government organizations, or by public utility companies, such as an electric power distribution company. The information received from the web server may comprise status data linked to locations identified by latitude longitude coordinates or by postal zip-codes, and the PSE network portal may build a map overlay based on analyzing those locations and transcoding them into an overlay shape scaled appropriately to a presentation view of the user interface of the PSE network portal.

In an embodiment, the user interface of the PSE network portal is configured to receive a drawn input from a user to define a location or perimeter relative to an area presented in the current display screen, and the PSE network portal programmatically determines if the location/perimeter is in wireless communication coverage of the RAN. Alternatively, the PSE network portal may provide more detailed highlighting of relevant cell sites which are in practical or theoretical wireless communication coverage of the drawn area and the status of those cell sites. To support this presentation of wireless communication coverage, the PSE network portal may analyze a variety of data such as current transmitted power of the subject cell sites, a history of received signal strengths reported by mobile communication devices linked to their location when the subject signal strength data was collected. This information can be processed to estimate the current wireless communication coverage. This feature may be helpful, because the local terrain and the local radio environment can impact wireless communication coverage in complex ways that are difficult to predict by non-technical people and reduce the value of an eyeballed guess by a non-technical dispatcher of which cell sites are most relevant to the wireless communication coverage available in an area.

The public stewardship entity may use the presentation of wireless communication coverage to evaluate whether an emergency short message service (SMS) evacuation message was likely to have been delivered to residents in a selected area or whether the public stewardship workers need to go door-to-door (because the emergency SMS evacuation message would not be expected to have reached those residents because of the lack of wireless communication coverage). In an embodiment, the PSE network portal provides a user interface control to request an estimation of the likelihood that an emergency SMS message has reached residents in an area that is defined by the public stewardship worker or public stewardship dispatcher using the user interface. The user interface may return a probability in the range of 0 percent likelihood to 100 percent likelihood. Alternatively, the user interface may provide a control input for selecting a threshold probability for determining a binary projection of "likely delivered" or "not likely delivered."

In an embodiment, the PSE network portal analyzes the OSS data to determine the status of cell sites proximate to an input public stewardship event location. If the PSE network portal determines that wireless communication service in the area proximate to the public stewardship event location is degraded, for example if one or more cell sites proximate to the location have an impaired operational status, the PSE network portal may automatically uplift a priority of one or more mobile communication devices of public stewardship workers dispatched to respond to the public stewardship event. When a priority of a mobile communication device is uplifted it is provided a wireless communication link if any wireless links not already used by other equal or higher prioritized devices are available. If all wireless links or channels available from a cell site are in use, but one mobile communication device using one of the wireless links is a device having a lower priority, that lower priority device may be forced off the wireless link (e.g., its call drops) and the wireless link may be provided to the mobile communication device having an uplifted priority. Uplifting a mobile communication device may also entail providing a higher quality of service (QoS) to the uplifted device, for example guaranteeing it a higher data throughput rate and/or providing it more frequency bandwidth. The PSE network portal may uplift the priority of one or more devices by communicating with a server in a wireless communication service provider core network and sending an uplift message that identifies one or more mobile communication devices to be uplifted and a service area for which the uplift is desired. In an embodiment, the PSE network portal may identify the service area by designating one or more cell site identities. In an embodiment, the PSE network portal may identify the service area by designating one or more zip-codes. In an embodiment, the PSE network portal may identify the area by another way.

A public stewardship worker may be able to select different mobile communication devices when responding to an emergency, for example different devices supported by different service providers who operate using different RAN infrastructure, for example, different devices configured to operate at different frequencies and/or according to different telecommunication protocols. For example, a public stewardship dispatcher or public stewardship worker can assess whether device A associated with a first wireless service provider is better than device B associated with a second wireless service provider at a location of interest (e.g., where the public stewardship worker is going to respond to an emergency or a public stewardship event) using the PSE network portal. For example, a public stewardship dispatcher or public stewardship worker can assess whether device C associated with a first wireless telecommunication protocol is better for use than device D associated with a second wireless telecommunication protocol at the public stewardship event location using the PSE network portal.

A wireless communication service provider may also have knowledge or insight into which radio bands, which frequency ranges, and/or which wireless telecommunication protocols are most productive and/or suitable for use at the location of a public stewardship event. In an embodiment, the PSE network portal may reach out to mobile communication devices (e.g., multi-protocol, multi-band devices) of the public stewardship workers and configure them to use the most suitable radio band, frequency range, and/or wireless telecommunication protocol based on the subject location of interest. In this embodiment, the mobile communication devices of the public stewardship workers may be special firmware devices to prioritize preferred bands when selected or commanded—and may even have back channel communications with the network to use the disclosed overall approach to identify preferred frequencies serving a defined area and then automatically align the devices to focus on the preferred frequencies.

In an embodiment, the PSE network portal may automatically determine that a cell site in an emergency location is not receiving power (because the electric grid is down in that location, based on accessing power grid status reports from a web server). The PSE network portal may automatically notify or indicate to the wireless service provider that it is a priority to deploy an electric generator to a designated cell site in the emergency location. The PSE wireless communication network portal may provide support for public stewardship workers, for example home land security officers, interdicting or rounding up suspected terrorists or handling an "active shooter" event at a school or public building.

The PSE wireless communication network portal described herein is a specific technical solution to a specific technical problem. The technical problem includes (1) assessing current wireless communication service performance at a public stewardship event location (e.g., fire, flood, severe weather damage location) by a public stewardship entity (e.g., a fire station, a police station) and (2), based on that assessing, adapting public stewardship worker wireless communication equipment timely before the public stewardship worker is dispatched to go into harm's way. The PSE wireless communication network portal addresses the challenge of combining current network status information, information of locations of cell sites, information on cell site antennas, network trouble ticket systems, and tower coverage information (e.g., wireless network information pulled from the OSS) with information pulled from outside data sources. These outside data sources can be accessed dynamically by the PSE wireless communication network portal as needed to obtain information on electric power distribution, flood, weather, and other conditions, for example, by reaching out to public information websites. Data about the mobile communication devices used by the public stewardship workers can be accessed and analyzed, in combination with the other available information, to make recommendations of what devices to carry to respond to an event and, in an embodiment, to automatically configure the operation of the device for improved service at the subject event location. In sum, the PSE wireless communication network portal pulls together, synchronizes, and aligns relevant data from disparate sources to provide the desired situational awareness and then integrates information about devices and networks information to take actions based on analysis. The situational awareness provided by the PSE network portal promotes public stewardship workers selecting and configuring mobile communication devices that efficiently support collaboration of public stewardship workers addressing a public stewardship event. The situational awareness provided by the PSE network portal can promote the public stewardship workers better understanding the public stewardship event location. For example the PSE network portal may inform them that wireless communication service is out at a public stewardship event location, whereby the public stewardship workers may infer that absence of received 911 emergency calls does NOT indicate all's well at the public stewardship event location.

Turning now to FIG. 1, a communication system 100 is described. In an embodiment, the system 100 comprises a plurality of mobile communication devices (user equipment—UE) 102, a plurality of cell sites 106, and a network 108. A UE 102 may be a cell phone, a mobile phone, a smart phone, a personal digital assistant (PDA), an Internet of things (IoT) device, a wearable computer, a headset computer, a laptop computer, a tablet computer, or a notebook computer. The network 108 may be one or more private networks, one or more public networks, or a combination thereof. The cell sites 106 provide wireless communication links to the UE 102 according to a 5G, a long term evolution (LTE), a code division multiple access (CDMA), or a global system for mobile communications (GSM) wireless telecommunication protocol. Some of the UEs 102 may be able to support two or more different wireless telecommunication protocols and accordingly may be referred to in some contexts as multi-protocol devices. In an embodiment, one or more of the UEs 102 may carry on wireless communication based on frequency parameters 104 and/or wireless telecommunication protocol selection parameters stored in a non-transitory memory of the UE 102. In an embodiment, the frequency parameters 104 may be reprogrammed over-the-air, for example via a configuration command received by a UE 102 from a cell site 106. In another embodiment, the frequency parameters 104 may be reprogrammed via a wired communication link, for example via a docking station or via a recharging plug. The UEs 102 may communicate with each other and with a public stewardship entity headquarters 110 via the wireless links provided by the cell sites 106 and via wired links provided by the network 108. In an embodiment, the public stewardship entity headquarters 110 may be a communication center such as a private branch exchange (PBX) or other dispatcher private phone system.

The UEs 102 are associated with public stewardship workers who may rely on the UEs 102 to carry out their duties in responding to public stewardship events, for example responding to wild fires, responding to floods, responding to severe weather damage, responding to accidental release of hazardous materials, and responding to other public stewardship events. A first public stewardship worker who arrives first at an event location may establish a voice call via a first UE 102 to a second UE 102 used by a second public stewardship worker, for example to warn them about a low-hanging power line disturbed by a tree fall. The first public stewardship worker may establish a data call via the first UE 102 to download a safety data sheet (SDS) on a hazardous material released at an event location. The public stewardship workers may use the UEs 102 to provide mutual aid to each other and to coordinate their response to the public stewardship event. The public stewardship dispatcher may use the public stewardship entity headquarters 110 and the wireless communication network to manage the emergency response (e.g., manage the actions of dispatched public stewardship workers). For the safety of the public stewardship workers and for the efficient completion of their public stewardship event response mission, the UEs 102 and the cell sites 106 desirably function at a high level of performance. But the public stewardship events themselves may interfere with the communications infrastructure.

The system 100 further comprises a computer system 120 that executes a public stewardship entity (PSE) wireless communication network portal application 122. In some contexts, the PSE wireless communication network portal application 122 may be referred to as a PSE network portal application 122 or as a PSE network portal 122. The PSE network portal application 122 accesses operational support system (OSS) data store 124 to obtain information about the cell sites 106 and/or the network 108. The information about the cell sites 106 and/or the network 108 may be referred to as operations data. The OSS data store 124 may be used by a network operations center (NOC) system (not shown) used by a wireless communication service provider to help its own engineers and technicians to maintain and operate a radio access network (RAN). The information stored in the OSS data store 124 may be reported by software agents executing on the cell sites 106. The information stored in the OSS data store 124 may be collected by a NOC application that polls the cell sites 106 to obtain status information and operating metrics.

The PSE network portal application 122 analyzes the information it reads from the OSS data store 124 to determine statuses of cell sites 106. While the information stored in the OSS data store 124 is kept up-to-date, in an embodiment, the digested cell site status assessment by the PSE network portal application 122 is not deemed to provide a real-time or near real-time view of the cell sites 106. In an embodiment, the PSE network portal application 122 analyzes the information in the OSS data store 124, for example about every five minutes, about every ten minutes, about every fifteen minutes, about every thirty minutes, about every hour, about every three hours, or some other periodic interval. The system 100 may comprise one or more web servers 126 that each execute a web application 128. The web applications 128 may support a web page, for example a public information web site. The web applications 128 may also support a programmatic or application programming interface (API) that can be accessed by other computers to access information from the web applications 128.

The system 100 further comprises at least one workstation 130 that provides a user interface 132 for interacting with the PSE network portal application 122 and presenting information produced by the PSE network portal application 122 based on analyzing the information in the OSS data store 124. The public stewardship entity headquarters (PSW HQ) 110 and the workstation 130 may be located at a public stewardship building 112, for example a fire station, a police station, a federal emergency management agency (FEMA) station, a forest service office, a national guard post, a military post, a coast guard station, or other public stewardship entity. While FIG. 1 shows a single public stewardship building 112, in an embodiment, the system 100 comprises a plurality of public stewardship buildings 112, and each public stewardship building 112 may have a workstation 130 executing the user interface 132.

The PSE network portal application 122 is able to respond to inputs from the UI 132 to present network status information on a map in a display screen of the UI 132. By hovering a cursor over a portion of the map, network status information associated with the portion of the map hovered over may be selected for display, for example network status information associated with a state over which the cursor hovers or network status information associated with a county over which the cursor hovers. Alternatively, network status information associated with a portion of the map may be selected for display by positioning the cursor over the portion of the map (e.g., a state area or a county area) and clicking. The inputs of the UI 132 may select different geographic scales for presenting network status information, for example nationwide status information, statewide status information, countywide status information, and/or yet smaller scope. The inputs of the UI 132 may stipulate a geographic location. The UI 132 may then display a network status map including the input geographic location where the map is scaled in size based on the geographic scale input.

In an embodiment, a user may be able to zoom the geographical scale of the network status map larger or smaller and displace the map using a mouse, using keyboard keys, or using another input device. In an embodiment, a user may use a pen input device or a mouse input device to draw a perimeter over a presented map, and this input may be analyzed by the PSE network portal application 122 to determine a user area definition. The PSE network portal application 122 may then present network status information about cell sites 106 located within the network status map and/or the user defined area on the UI 132. Further details of the UI 132 and the operation of the PSE network portal application 122 are described below.

Figure 2:
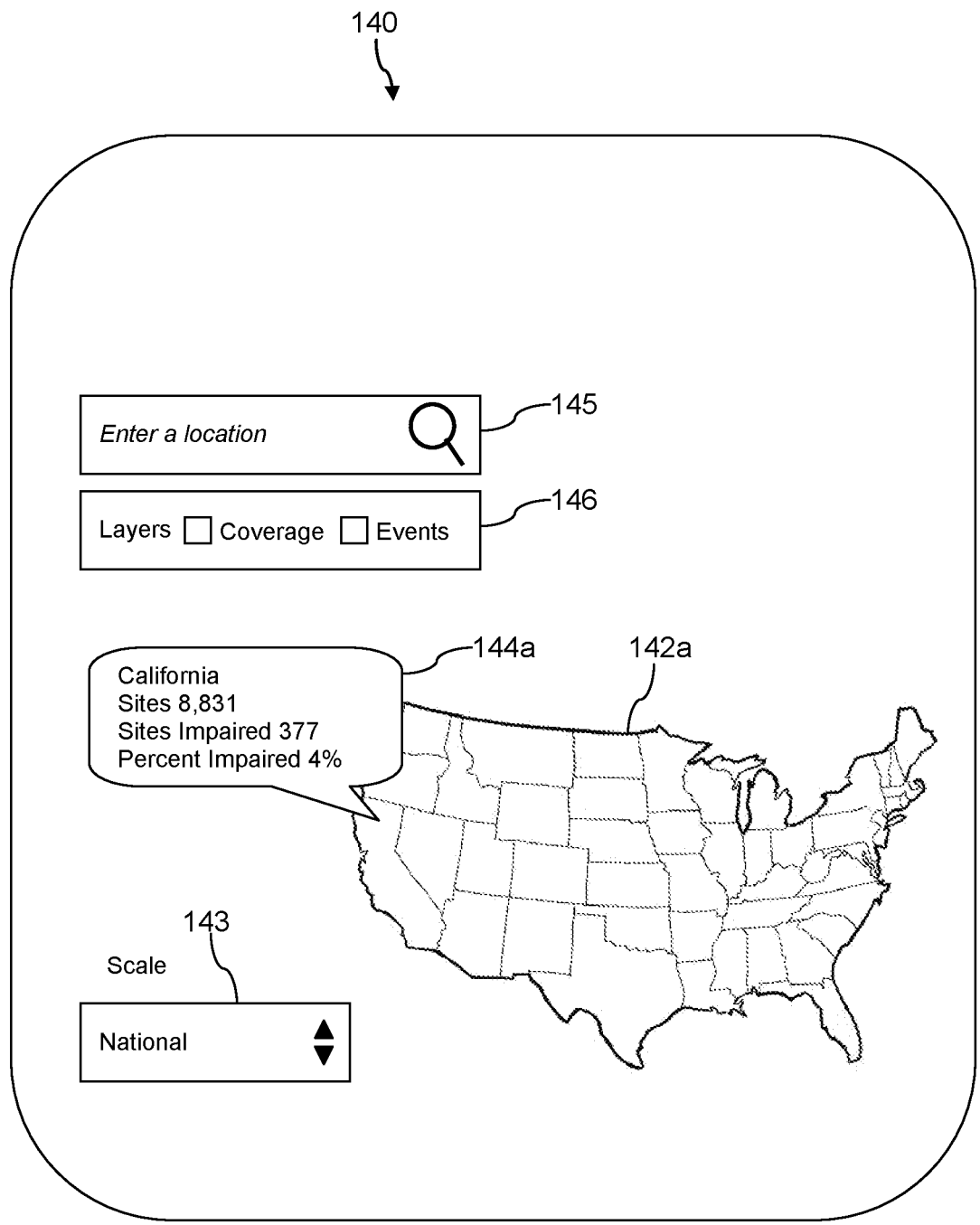
FIG. 2 is an illustration of a first user interface screen of a public stewardship entity wireless communication network portal according to an embodiment of the disclosure.

Turning to FIG. 2, a first screen 140 of the UI 132 is described. In an embodiment, the first screen 140 provides a network status map 142a, in this case a nationwide map of the United States. The first screen 140 comprises a geographic scale input box 143. The geographic scale input box 143 promotes selecting a national geographic scale, a statewide geographic scale, or a county geographic scale. By hovering the cursor over a state and/or by clicking on a state, a network status summary 144a of cell sites in the selected state is presented in the display 140.

The statewide network status summary 144a indicates a total number of cell sites in the selected state, a number of cell sites with an impaired status in the state, and a percentage of cell sites in the state that have an impaired status. Because the public stewardship workers and public stewardship dispatcher are not presumed to be expert in wireless communication technology, details of cell site performance are abstracted and rolled into a small number of different statuses. For example, in an embodiment, status of a cell site may be indicated as either (1) working as designed or (2) impaired service. In another embodiment, a different number of statuses of cell sites may be used. For example, in another embodiment, status of cell sites may be indicated as either (1) working as designed, (2) impaired service, or (3) out-of-service. Working as designed may be when the cell site is supporting both voice and data communications and able to carry full traffic loads. Impaired may be when (a) voice is supported but data is out-of-service, (b) data is supported but voice is out-of-service, (c) voice and data are available but the cell site is unable to carry full traffic loads. In another embodiment, a different definition of impaired status may be used. Out-of-service may be when the cell site cannot carry either voice or data traffic.

The first screen 140 comprises a geographic location text input box 145 and a layer selection input box 146. The geographic location text input box 145 allows inputting a geographic location, for example by providing latitude and longitude coordinates, by providing GPS coordinates, by providing postal zip-codes, and/or by providing a postal address. When the geographic location text input box 145 is activated (e.g., clicked on with a geographic location value provided in the text field), the network status map 142 presents a map enclosing the input geographic location, for example in about the center of the network status map 142, where the map is scaled at about the scale defined by the geographic scale input box 143. As an example, if a geographic location near Lake Tahoe is selected while the geographic scale input box 143 is selected to the statewide geographic scale, a network status map 142 may be presented by the PSE network portal application 122 that shows portions of California and portions of Nevada, with the Lake Tahoe region in about the middle of the display (Lake Tahoe is located on the border between California and Nevada).

In an embodiment, the layer selection input box 146 supports selecting a wireless service coverage overlay and selecting an event overlay. The coverage overlay may indicate areas in which wireless communication service is normally provided by a wireless communication service provider, areas where roaming coverage is available to subscribers of the wireless communication service provider, and areas that have no wireless coverage in the service plan of the wireless communication service provider. The coverage overlay is graphically overlaid over the network status map 142 that is presented in the first screen 140a or another screen 140 that is presented. The public stewardship dispatcher can use the coverage overlay view to assess the quality and/or availability of wireless communication service available at a public stewardship event location, for example at a location of a fire, before dispatching public stewardship workers to that public stewardship event location.

The event overlay may be selected to display event information overlaid over the network status map 142 that is presented in the first screen 140a or another screen 140 that is presented. The event overlay may be a fire event overlay, a red flag warning event overlay (e.g., elevated fire danger warning), a flood event overlay, a flash flood danger event overlay, a high wind warning event overlay, a dense fog event overlay, a blizzard event overlay, a severe weather damage event overlay, and/or a frost warning event overlay. In an embodiment, the UI 132 is limited to presenting one event overlay at a time. In another embodiment, however, some event overlays may be presented overlaid with each other at one time. When an event type is selected with the layer selection input box 146, the PSE network portal application 122 may access a web server 126 that executes a web application 128 associated with the selected event type. For example, if a fire event type is selected, the PSE network portal application 122 may access an active fire web application 128 on a web server 126 supported by US or state government. If a flood event type is selected, the PSE network portal application 122 may access a flood web application 128 on a web server 126 supported by the US or state government, for example supported by the US Army Corps of Engineers. The event information received from the web application 128 may associate data to geographical location defined with latitude longitude coordinates, GPS coordinates, and/or postal zip-codes. The PSE network portal application 122 analyzes the data to present it as an overlay graphic in the network status map 142. The public stewardship dispatcher can use the event overlay view to locate cell sites relative to public stewardship events (public stewardship events may be related to or identical with the selected event overlay). By selecting different event overlays, the public stewardship dispatcher may be able to assess the potential impact on wireless communication service of events that are independent from the specific public stewardship event they are dispatching public stewardship workers to respond to. For example, when responding to a fire, the public stewardship dispatcher may wish to see the area of the fire in the context of a severe weather event overlay or in the context of electric power distribution service availability.

Figure 3:
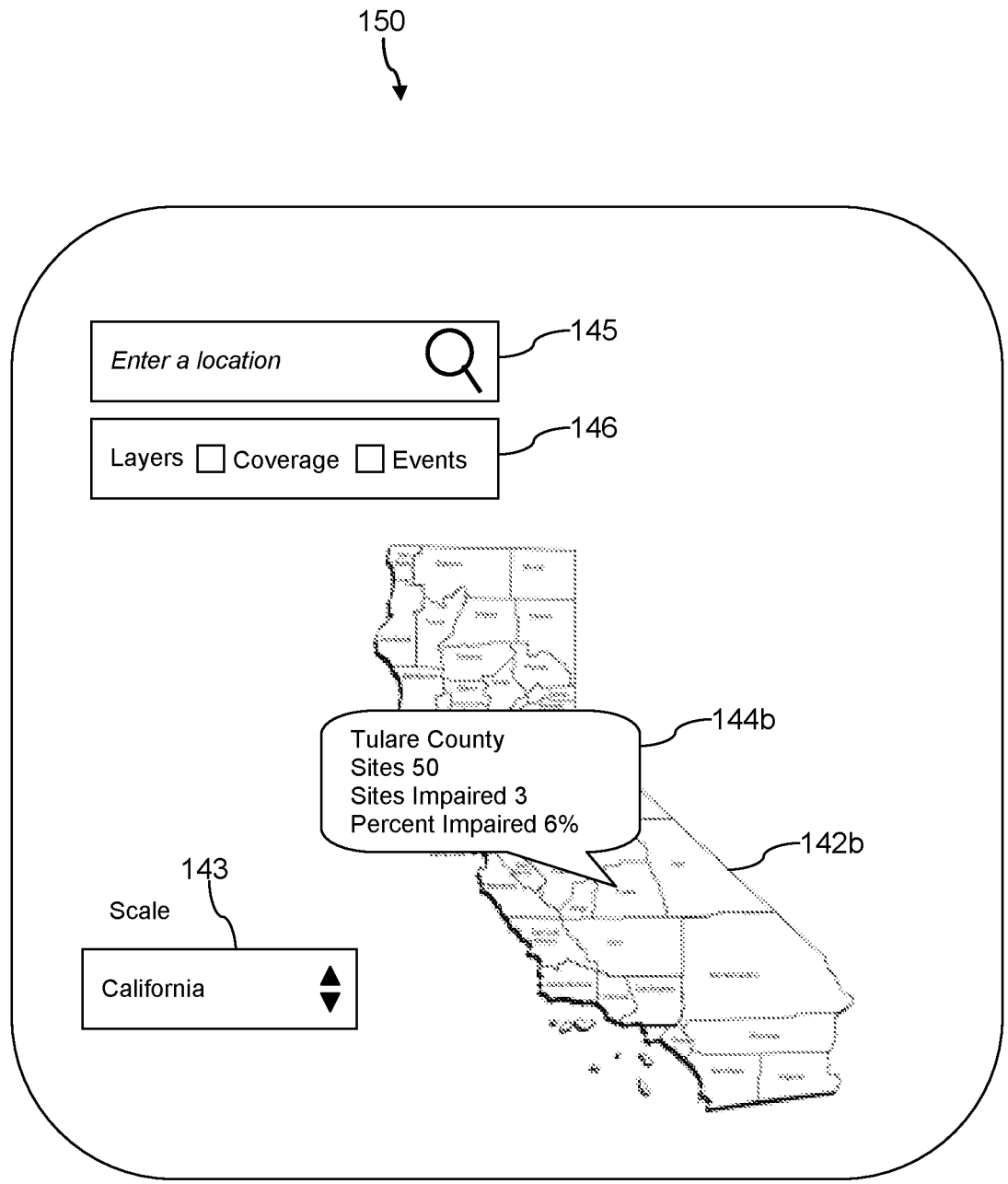
FIG. 3 is an illustration of a second user interface screen of a public stewardship entity wireless communication network portal according to an embodiment of the disclosure.

Turning now to FIG. 3, a second screen 150 is described. The second screen shows a network status map 142b selected to a statewide geographical scale, in this case the state of California. The network status map 142b shows the counties of the state of California. By clicking on and/or by hovering a cursor over a county presented in the network status map 142b, a countywide network status summary 144b of cell sites in the selected county is presented in the second screen 150. The countywide network status summary 144b indicates a total number of cell sites in the selected county, a number of cell sites with an impaired status in the county, and a percentage of cell sites in the county that have an impaired status. The second screen 150 also presents the geographic scale input box 143, the geographic location text input box 145 and the layer selection input box 146 described above with reference to FIG. 2.

Figure 4:
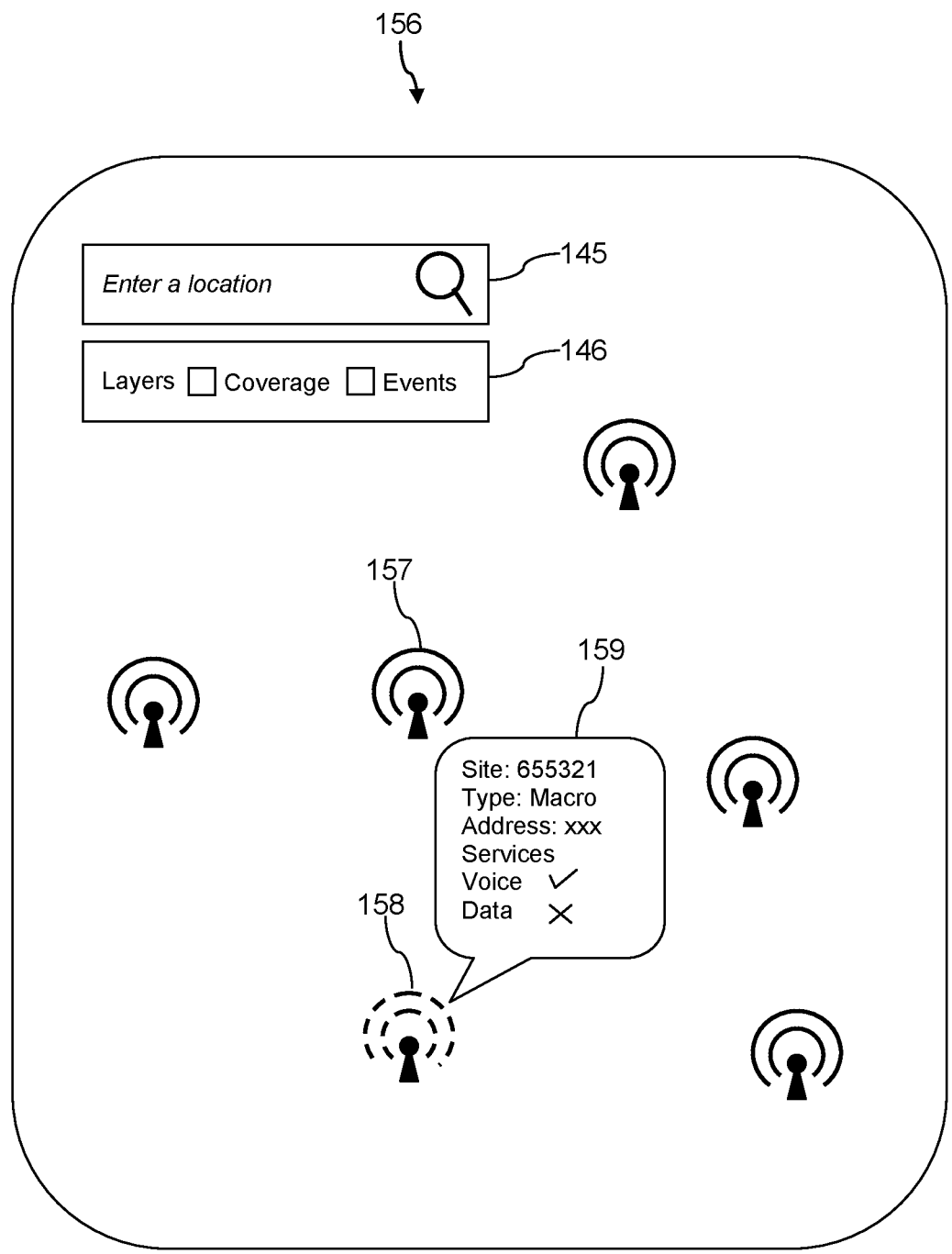
FIG. 4 is an illustration of a third user interface screen of a public stewardship entity wireless communication network portal according to an embodiment of the disclosure.

Turning now to FIG. 4, a third screen 156 is described. The third screen 156 presents icons representing a plurality of cell sites in a selected area. The area may be a portion of a county. The area may be selected by a pen input or a mouse input that draws or traces a boundary within a display of a state boundary or a display of a county boundary. A first cell site 157 is presented with concentric semi-circles suggestive of radio frequency emission, where the semi-circles are solid lines indicating the subject cell site 157 is working as designed. A second cell site 158 is presented with dotted line semi-circles that indicate the second cell site 158 is providing impaired service, for example providing voice communication without data communication service. In other embodiments, the status of cell sites may be indicated with other distinctive graphical features, for example with a color coding, for example with a ghosting effect, or other graphical features. A cell site status summary 159 is presented when a cell site is clicked on and/or hovered over with a cursor, indicating the identity of the cell site, the type of the cell site, a postal address of the cell site, an indication that voice communication is active, and an indication that data communication is unavailable.

With reference now to FIG. 1, FIG. 2, FIG. 3, FIG. 4, and FIG. 5, a public stewardship dispatcher can use the PSE network portal application 122 and the user interface 132 to obtain situational awareness of the wireless communication service availability at a public stewardship event location. In an embodiment, by using the PSE network portal application 122 and the user interface 132, the public stewardship dispatcher may gain insight into wireless signal propagation and wireless backhaul and answer the question "can the public stewardship workers make voice calls and connect to the Internet at the location of the public stewardship event?" The public stewardship dispatcher may use the PSE network portal application 122 and the user interface 132 to send public stewardship workers to a public stewardship event location using UEs 102 associated with a first wireless communication service provider by preference to using UEs 102 associated with a second wireless communication service provider.

In an embodiment, the PSE network portal application 122 may automatically configure preferred frequency parameters 104 and/or select preferred telecommunications protocols for use by the UEs 102, based on analysis of operations data read from the OSS data store 124. The PSE network portal application 122 may determine that some frequencies and/or some technologies (i.e., telecommunications protocols) will serve better in the current situation revealed by analysis of the operations data. The PSE network portal application 122 may transmit commands to a corresponding client application on the UE 102 to command the UE 102 download and install the frequency parameters and/or technology selection.

In an embodiment, the PSE network portal application 122 may automatically interwork with a provisioning server in a core network of a wireless communication service provider to uplift the priority of the UEs 102 being used by public stewardship workers dispatched to respond to a public stewardship event. The PSE network portal application 122 may determine that one or more cell sites proximate the designated public stewardship event location are deemed to have an impaired status or an out-of-service status, and infer from this that it may be difficult for the UEs 102 of the public stewardship workers to obtain wireless links from the cell sites 106 proximate the public stewardship event location. The PSE network portal application 122 may send one or more uplift messages to the provisioning server identifying the cell sites 106 for which uplifted priority is requested and identifying the UEs 102 to be granted uplifted priority. The uplift messages may further identify a minimum quality of service (QoS) with which the UEs 102 are desirably to be treated by the radio access network (RAN) and the cell sites 106.

Figure 5:
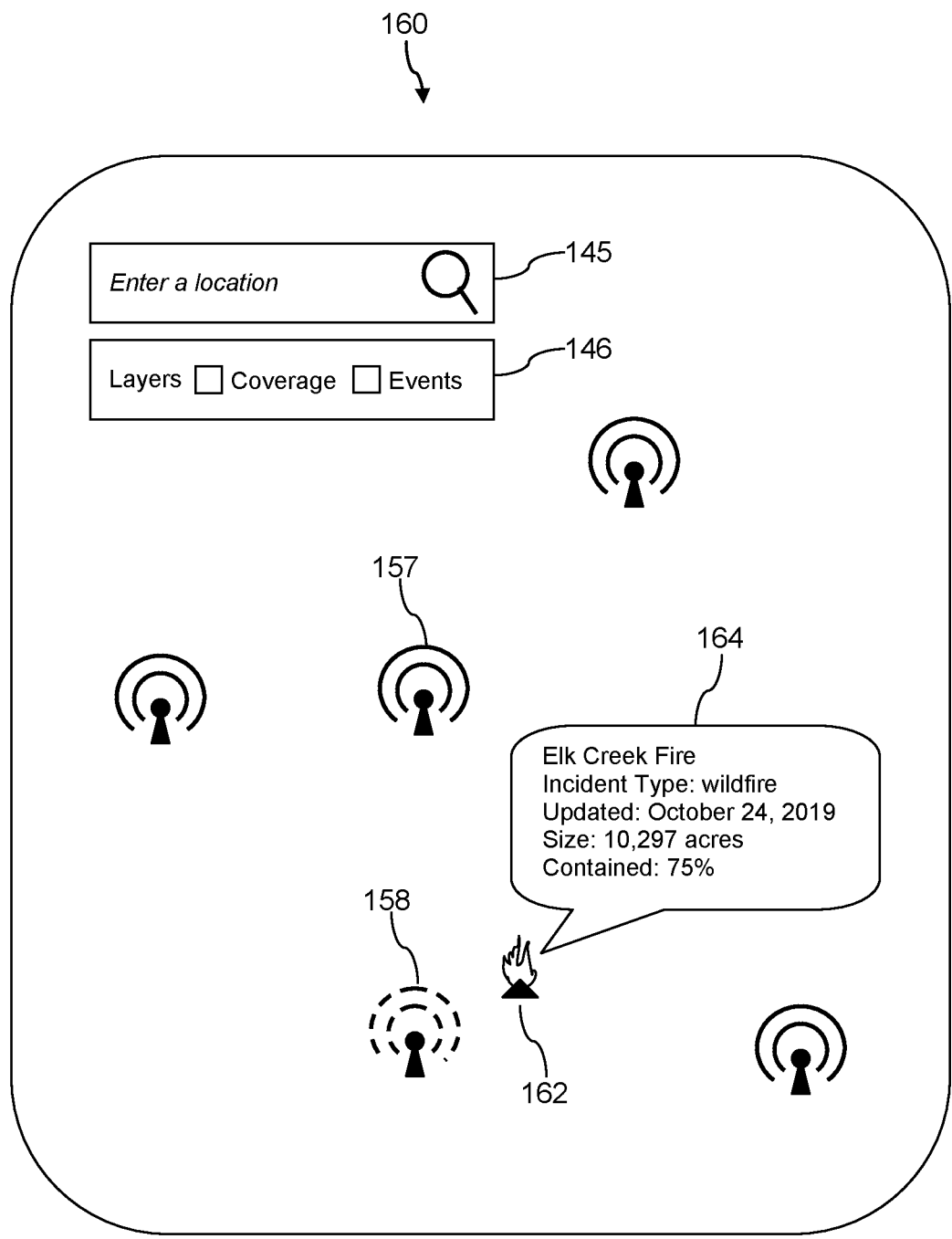
FIG. 5 is an illustration of a fourth user interface screen of a public stewardship entity wireless communication network portal according to an embodiment of the disclosure.

Turning now to FIG. 5, a fourth screen 160 is described. The fourth screen 160 presents a fire event overlay 162. An event status summary 164 is presented when the fire icon is clicked on and/or is hovered over by a cursor, indicating a name of the subject event, an event subtype designation, when the event information was last updated, a size associated with the event, and a metric on the event. It is understood that different event overlays may be associated with different event status summary 164 displays, because the summary information associated with different events are likely to differ in one or more aspects.

Figure 6:
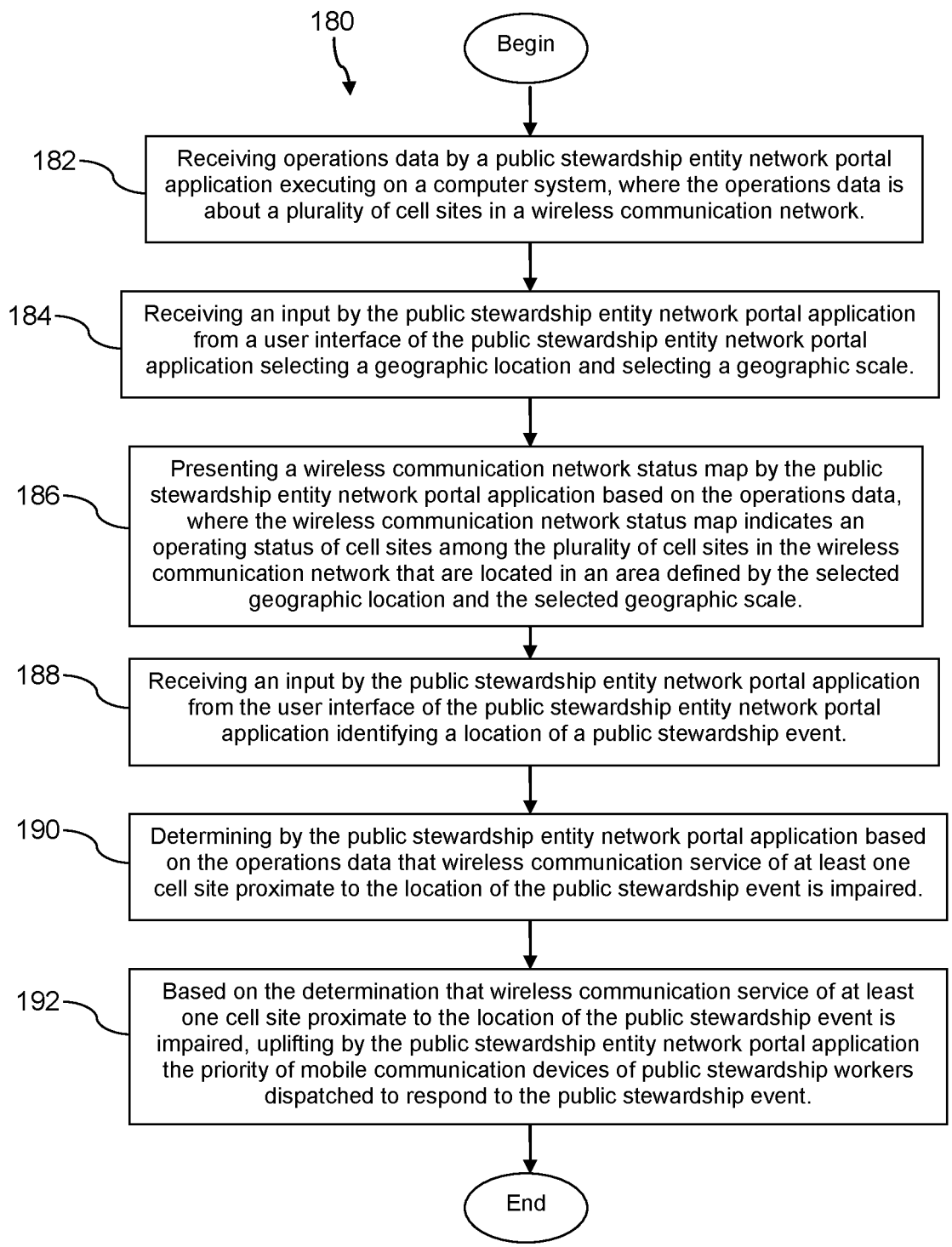
FIG. 6 is a flow chart of a method according to an embodiment of the disclosure.

Turning now to FIG. 6, a method 180 is described. In an embodiment, the method 180 is a method of monitoring a wireless communication network and managing priority uplift for mobile communication devices of public stewardship workers. At block 182, the method 180 comprises receiving operations data by a public stewardship entity network portal application executing on a computer system, where the operations data is about a plurality of cell sites in a wireless communication network.

At block 184, the method 180 comprises receiving an input by the public stewardship entity network portal application from a user interface of the public stewardship entity network portal application selecting a geographic location and selecting a geographic scale. At block 186, the method 180 comprises presenting a wireless communication network status map by the public stewardship entity network portal application based on the operations data, where the wireless communication network status map indicates an operating status of cell sites among the plurality of cell sites in the wireless communication network that are located in an area defined by the selected geographic location and the selected geographic scale.

At block 188, the method 180 comprises receiving an input by the public stewardship entity network portal application from the user interface of the public stewardship entity network portal application identifying a location of a public stewardship event. At block 190, the method 180 comprises determining by the public stewardship entity network portal application based on the operations data that wireless communication service of at least one cell site proximate to the location of the public stewardship event is impaired. At block 192, the method 180 comprises, based on the determination that wireless communication service of at least one cell site proximate to the location of the public stewardship event is impaired, uplifting by the public stewardship entity network portal application the priority of mobile communication devices of public stewardship workers dispatched to respond to the public stewardship event. In an embodiment, uplifting the priority of mobile communication devices comprises sending a command by the public stewardship entity network portal application to a provisioning server of a wireless communication, whereby the provisioning server configures at least one cell site to grant higher priority for allocation of a wireless communication link to the uplifted mobile communication devices. In an embodiment, uplifting the priority of mobile communication devices comprises sending a command by the public stewardship entity network portal application to a provisioning server of a wireless communication, whereby the provisioning server configures at least one cell site to provide a predefined quality of service (QoS) to the uplifted mobile communication devices.

In an embodiment, the method 180 further comprises receiving an input by the public stewardship entity network portal application from the user interface of the public stewardship entity network portal application selecting an event type mapping overlay, retrieving event information by the public stewardship entity network portal application from a web server associated with the selected event type mapping overlay, and presenting event information by the public stewardship entity network portal application overlaid on the wireless communication network status map according to the input geographic scale and input geographic location. In an embodiment, the event type mapping overlay is one of a fire event overlay, a fire danger event overlay, a red flag danger event overlay, a flooding event overlay, a high wind event overlay, an electric power distribution outage event overlay, a severe weather damage event overlay, a dense fog event overlay, a freeze warning event overlay, or a blizzard event overlay.

Figure 7A:
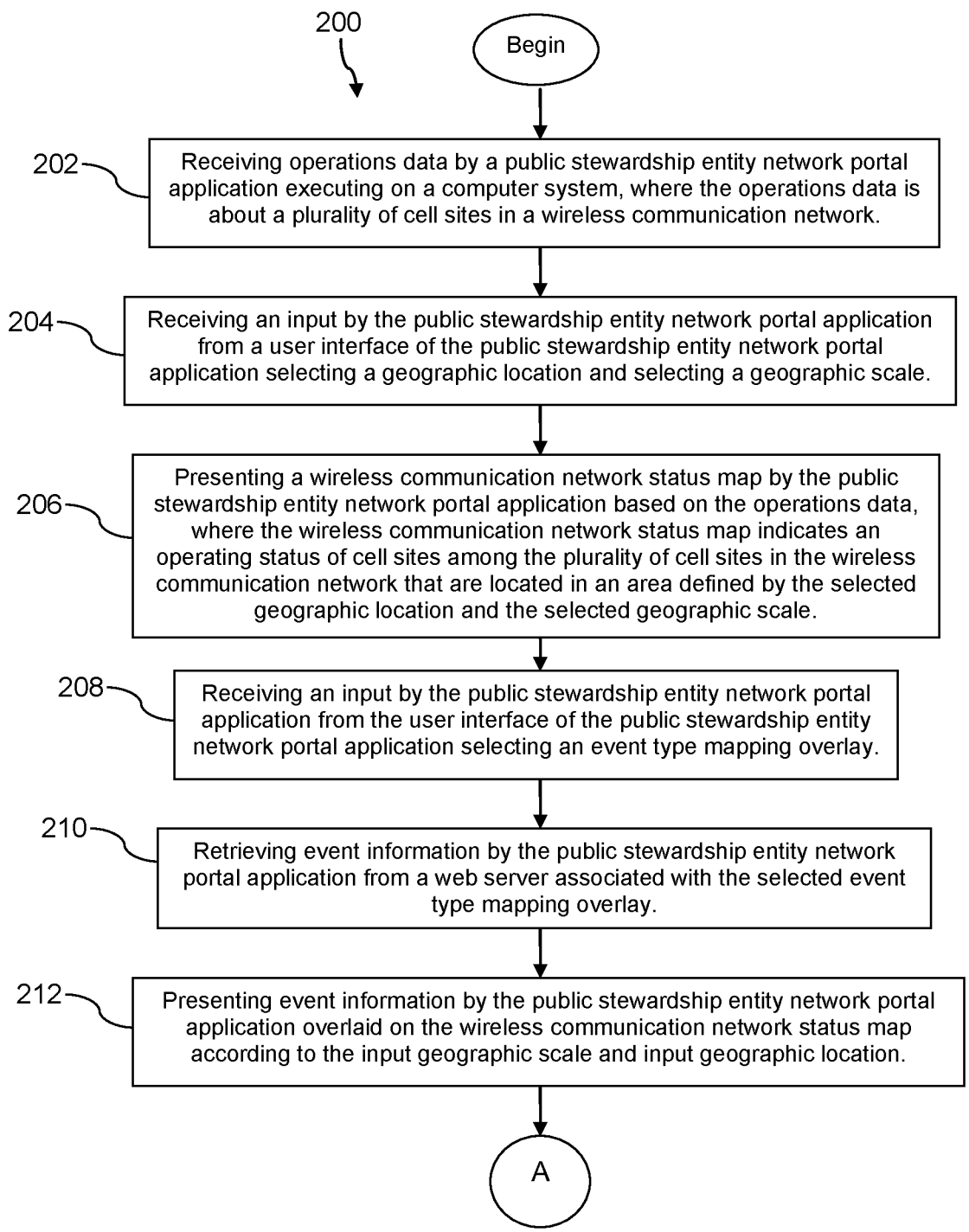
FIG. 7A and FIG. 7B is a flow chart of another method according to an embodiment of the disclosure.
Figure 7B:
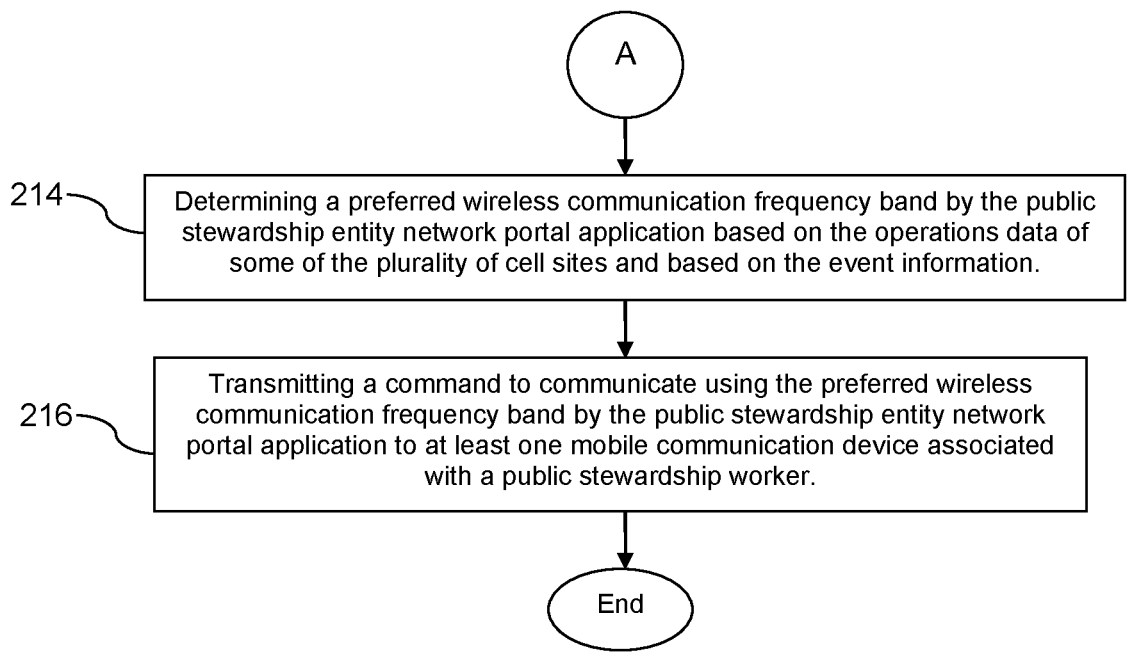

Turning now to FIG. 7A and FIG. 7B, a method 200 is described. In an embodiment, method 200 is a method of monitoring a wireless communication network and controlling wireless frequencies used by mobile communication devices of public stewardship workers. The method 200 may be performed by the PSE wireless communication network portal application 122 and/or the UI 132 described above. At block 202, the method 200 comprises receiving operations data by a public stewardship entity network portal application executing on a computer system, where the operations data is about a plurality of cell sites in a wireless communication network. For example, the PSE network portal application 122 accesses and retrieves network operations data from the OSS data store 124. In an embodiment, the PSE network portal application 122 may retrieve all of the OSS data available. Alternatively, in another embodiment, the PSE network portal application 122 may retrieve a sub-set of the OSS data available in the OSS data store 124, for example a sub-set of OSS data that pertains to a selected geographical scope. The operations data may comprise active alarms on cell sites, active trouble tickets associated with cell sites, key performance indicators (KPIs) associated with cell sites. The operations data may comprise information about routers associated with the cell sites or that link the cell sites to the network 108 by wired communication links. The operations data may comprise information about radio frequency transmission power levels of cell sites. The operations data may partition the operation data according to different frequencies supported by cell sites and according to different telecommunications protocols.

At block 204, the method 200 comprises receiving an input by the public stewardship entity network portal application from a user interface of the public stewardship entity network portal application selecting a geographic location and selecting a geographic scale. The geographic location may be designated by selecting a state or a county by clicking on a network status map. The geographic location may be designated by selecting a geographic location comprising a latitude longitude coordinate, a GPS coordinate, a postal zip-code, or a postal address. The geographic location may be designated by moving a mouse input device to position a display cursor in a network status map and clicking the mouse when the cursor is located at the desired geographic location in the network status map. The geographic location may be designated by using an electronic pen or mouse to draw a perimeter around an area of interest in a network status map. The geographical scale may be a nationwide scale, a statewide scale, a countywide scale, or another scale. In an embodiment, selecting a geographic scale may comprise selecting a nationwide geographic scale, a statewide geographic scale, or a countywide geographic scale.

At block 206, the method 200 comprises presenting a wireless communication network status map by the public stewardship entity network portal application based on the operations data, where the wireless communication network status map indicates an operating status of cell sites among the plurality of cell sites in the wireless communication network that are located in an area defined by the selected geographic location and the selected geographic scale. For example, status of cell sites in a designated area may be indicated as working as designed or indicated as providing impaired service. For example, status of cell sites may be indicated as working as designed, as providing impaired service, or as out-of-service. The status of cell sites may be indicated by using different color codes to indicate different operating statuses. For example, a cell site that is working as designed may be presented as a cell site icon having a green color and a cell site that is providing impaired service may be presented as a cell site icon having a red color. A cell site that is working as designed may be presented using solid lines while a cell site that is providing impaired service may be presented using dashed or dotted lines.

At block 208, the method 200 comprises receiving an input by the public stewardship entity network portal application from the user interface of the public stewardship entity network portal application selecting an event type mapping overlay. In an embodiment, the event type mapping overlay may be one of a fire event overlay, a red flag danger event overlay, a flood event overlay, a severe weather event overlay, a severe weather damage event overlay, a frost warning event overlay, an electric power distribution status overlay, or a high wind event overlay. In an embodiment, the method 200 may further comprise receiving an input by the public stewardship entity network portal application from the user interface of the public stewardship entity network portal application selecting a wireless communication service coverage mapping overlay.

At block 210, the method 200 comprises retrieving event information by the public stewardship entity network portal application from a web server associated with the selected event type mapping overlay. Different web servers may provide access to different event information, for example via different application programming interfaces (APIs) supported by different web applications executing on the different web servers. Some of the web servers may be operated by different government organizations to provide public service information.

At block 212, the method 200 comprises presenting event information by the public stewardship entity network portal application overlaid on the wireless communication network status map according to the input geographic scale and input geographic location. The event information may be presented as individual fire icons at positions on the networks status map corresponding to a location of the fires (e.g., a latitude and longitude associated with the origin of the fire or a center point of the fire). The event information may be presented as an enclosed region, for example an enclosed polygonal region or an amoeba-like enclosed region. For example, if the selected event overlay is a flooding event overlay, a region that is flooded may be depicted as an enclosed region, or if the selected event overlay is a red flag warning overlay, a region subject to a red flag warning (e.g., a region of high fire danger) may be depicted as an enclosed region.

At block 214, the method 200 comprises determining a preferred wireless communication frequency band by the public stewardship entity network portal application based on the operations data of some of the plurality of cell sites and based on the event information. The processing of block 214 may analyze the operations data obtained in block 202 and the event information received in block 210 to estimate what wireless communication technology (e.g., 5G, long term evolution (LTE), code division multiple access (CDMA), or global system for mobile communications (GSM)) may be preferred and/or what frequencies of may be preferred. This analysis may take into account more information than is presented in block 206. The information presented in block 206 may be simplified and/or abstracted for ease of use by non-technical persons, such as a dispatcher of public stewardship workers.

At block 216, the method 200 comprises transmitting a command to communicate using the preferred wireless communication frequency band by the public stewardship entity network portal application to at least one mobile communication device associated with a public stewardship worker. The command may be transmitted by the public stewardship entity network portal application via a wired communication link to the at least one mobile communication device, for example via a dongle, via a recharging cable connection, or via a docking station. The command may be transmitted by the public stewardship entity network portal application via a wireless communication link to the at least one mobile communication device. The command may set frequency parameters or telecommunication protocol parameters in the at least one mobile communication device to cause the device to communicate using preferred frequencies and/or to communicate using a preferred telecommunications protocol.

In an embodiment, the method 200 may further comprise uplifting one or more mobile communication devices used by public stewardship workers. For example, the public stewardship entity network portal application may send a message to one or more cell sites 106 and/or to a core network of a wireless communication service provider that requests an elevated and/or increased priority for the one or more mobile communication devices. A mobile communication device that is uplifted in this way is granted precedence by a cell site when seeking to place a voice call or a data call. For example, if all available channels of a cell site were in use, a mobile communication device with ordinary priority would be made to wait for an established call to go down before receiving a wireless link. By contrast, if an uplifted mobile communication device in a similar circumstance would not be made to wait, a lower priority mobile communication device having a wireless link would have its link broken (e.g., the call would drop), and the uplifted device would get the vacated wireless link.

In an embodiment, the method 200 further comprises determining a preferred telecommunications protocol by the public stewardship entity network portal application based on the operations data of some of the plurality of cell sites and based on the event information and transmitting a command to communicate using the preferred telecommunications protocol by the public stewardship entity network portal application to at least one mobile communication device associated with a public stewardship worker. In an embodiment, the preferred telecommunications protocol is one of a 5G, a long term evolution (LTE), a code division multiple access (CDMA), or a global system for mobile communications (GSM) telecommunications protocol.

Figure 8:
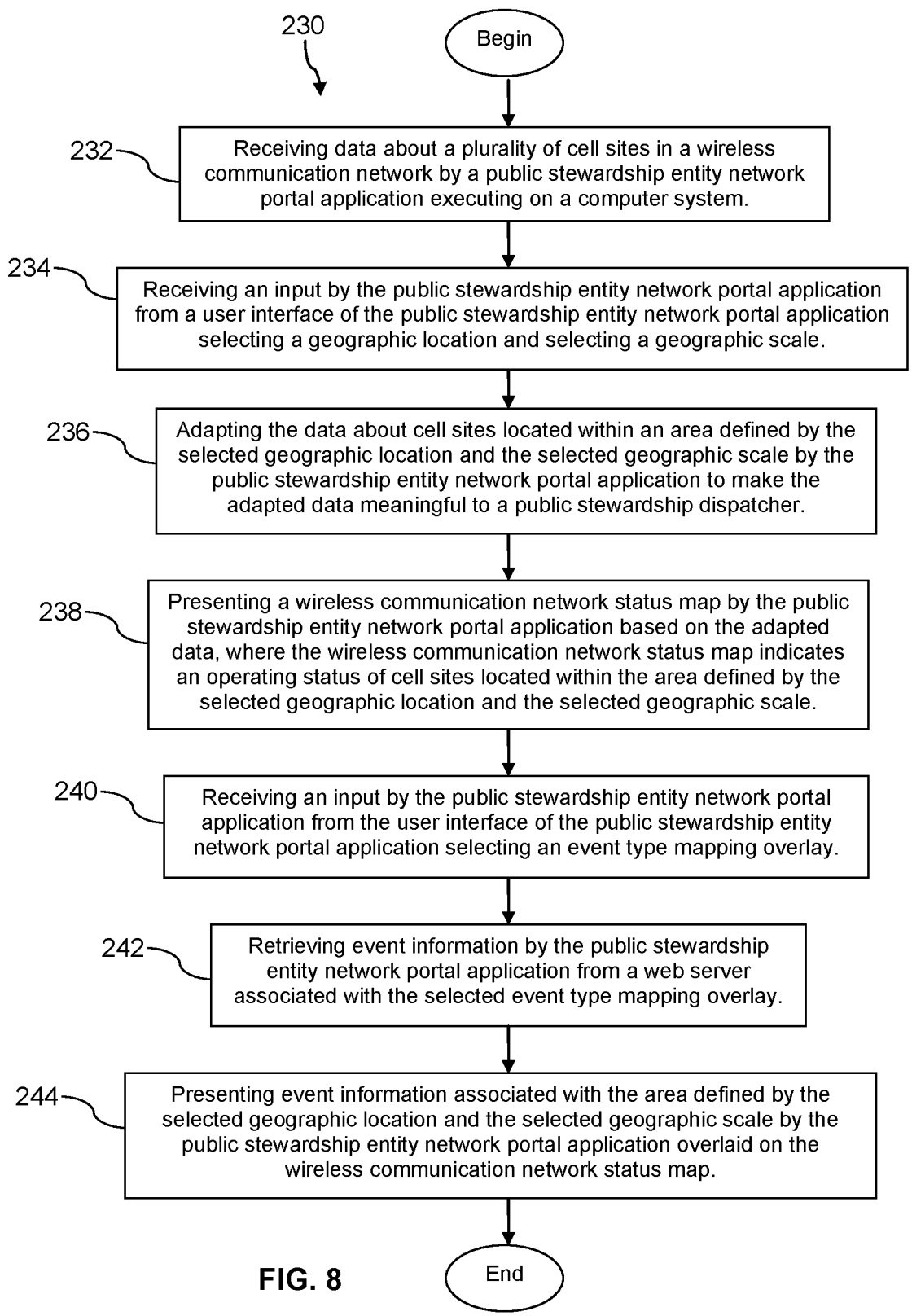
FIG. 8 is a flow chart of yet another method according to an embodiment of the disclosure.

Turning now to FIG. 8, a method 230 is described. In an embodiment, the method 230 is a method of monitoring a wireless communication network used by mobile communication devices of public stewardship workers. At block 232, the method 230 comprises receiving data about a plurality of cell sites in a wireless communication network by a public stewardship entity network portal application executing on a computer system. In an embodiment, the data about the plurality of cell sites is received from an operational support system (OSS), for example from the OSS data store 124. At block 234, the method 230 comprises receiving an input by the public stewardship entity network portal application from a user interface of the public stewardship entity network portal application selecting a geographic location and selecting a geographic scale.

At block 236, the method 230 comprises adapting the data about cell sites located within an area defined by the selected geographic location and the selected geographic scale by the public stewardship entity network portal application to make the adapted data meaningful to a public stewardship dispatcher and/or to a public stewardship worker. Adapting the data about cell sites may make the adapted data more suitable for use by a non-technical person such as a public stewardship dispatcher who cannot be expected to be expert in cellular communication technology. Adapting the data may include applying thresholding criteria to continuously variable key performance indicators (KPIs) associated with the cell sites, where KPI values below a threshold may lead to a cell site being deemed to provide impaired service and where KPI values above the threshold may lead to the cell site being deemed to be working as designed. In an embodiment, adapting the data about cell sites comprises analyzing the data received about the plurality of cell sites to categorize each cell site as being in one of an operating as designed status or an impaired service status. In an embodiment, adapting the data about cell sites comprises analyzing the data received about the plurality of cell sites to categorize each cell site as being in one of an operating as designed status, an impaired service status, or an out-of-service status.

At block 238, the method 230 comprises presenting a wireless communication network status map by the public stewardship entity network portal application based on the adapted data, where the wireless communication network status map indicates an operating status of cell sites located within the area defined by the selected geographic location and the selected geographic scale. At block 240, the method 230 comprises receiving an input by the public stewardship entity network portal application from the user interface of the public stewardship entity network portal application selecting an event type mapping overlay. In an embodiment, the input selecting an event type mapping overlay selects a fire event overlay, a fire danger event overlay, a red flag danger event overlay, a flooding event overlay, a high wind event overlay, an electric power distribution outage event overlay, a severe weather damage event overlay, a dense fog event overlay, a freeze warning event overlay, or a blizzard event overlay.

At block 242, the method 230 comprises retrieving event information by the public stewardship entity network portal application from a web server associated with the selected event type mapping overlay. At block 244, the method 230 comprises presenting event information associated with the area defined by the selected geographic location and the selected geographic scale by the public stewardship entity network portal application overlaid on the wireless communication network status map.

In an embodiment, the method 230 further comprises receiving an input from the user interface of the public stewardship entity network portal application by the public stewardship entity network portal application, where the input defines a geographical area and requests an estimation of the likelihood an emergency message was delivered to mobile communication devices located within the defined geographical area; estimating by the public stewardship entity network portal application the likelihood the emergency message was delivered to mobile communication devices located within the defined geographical area; and presenting by the public stewardship entity network portal application the estimated likelihood in the user interface of the public stewardship entity network portal application, whereby a public stewardship worker is enabled to decide if there is a need to go door-to-door within the defined geographical area to convey the emergency message. The emergency message may be an emergency SMS evacuation message or a multimedia message service (MMS) evacuation message.

Figure 9:
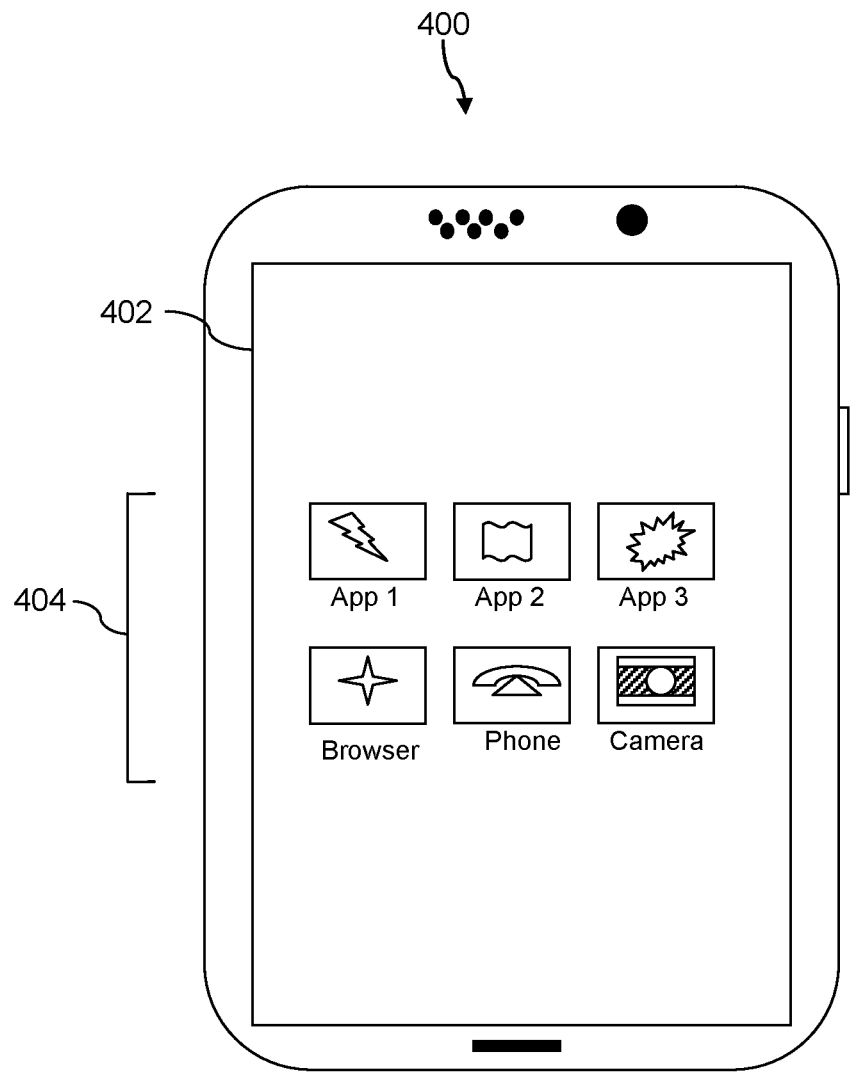
FIG. 9 is an illustration of a mobile communication device according to an embodiment of the disclosure.

FIG. 9 depicts the user equipment (UE) 400, which is operable for implementing aspects of the present disclosure (e.g., the UE 102 described above), but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 10:
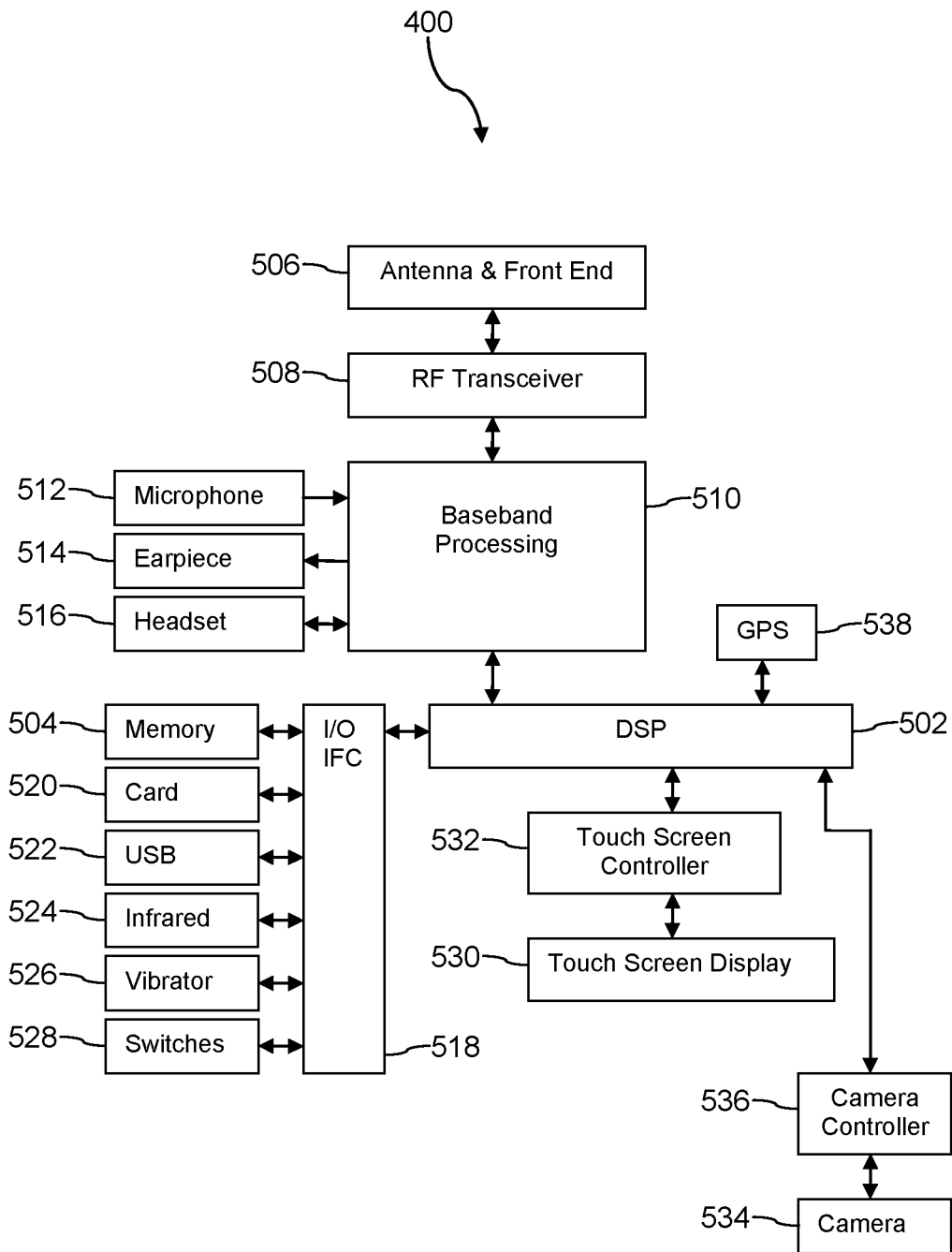
FIG. 10 is a block diagram of a hardware architecture of a mobile communication device according to an embodiment of the disclosure.

FIG. 10 shows a block diagram of the UE 400. In an embodiment, the UE 400 may be used to implement the UE 102 described above. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 11A:
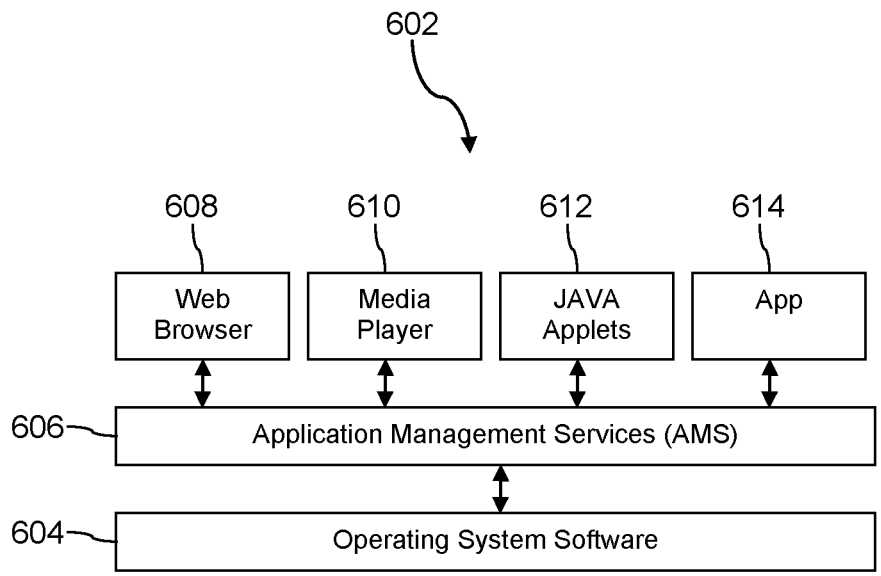
FIG. 11A is a block diagram of a software architecture of a mobile communication device according to an embodiment of the disclosure.

FIG. 11A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 11A are a web browser application 608, a media player application 610, JAVA applets 612, and an optional application 614. In an embodiment, the application 614 supports adapting radio frequency parameters 104 and/or wireless telecommunication protocol selection parameters of the UE 102. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 11B:
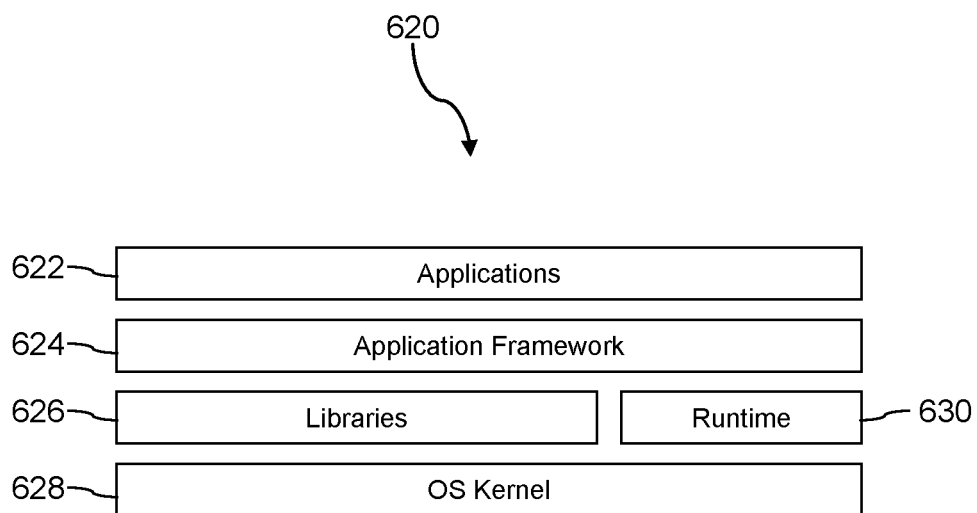
FIG. 11B is a block diagram of another software architecture of a mobile communication device according to an embodiment of the disclosure.

FIG. 11B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 12:
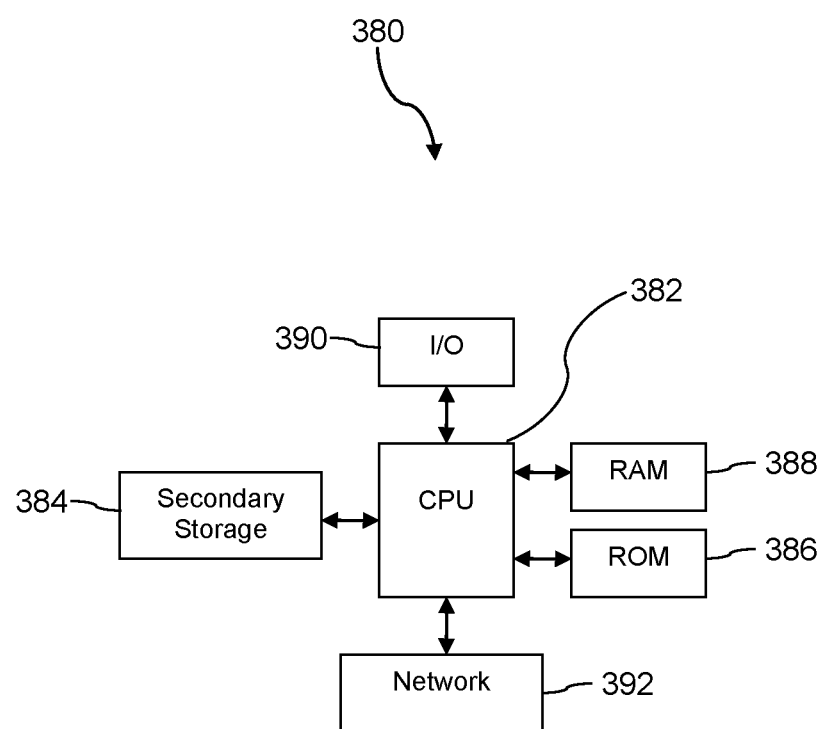
FIG. 12 is a block diagram of a computer system according to an embodiment of the disclosure.

FIG. 12 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of monitoring a wireless communication network and managing priority uplift for mobile communication devices of public stewardship workers, comprising:
   receiving operations data by a public stewardship entity network portal application executing on a computer system, where the operations data is about a plurality of cell sites in a wireless communication network;
   receiving an input by the public stewardship entity network portal application from a user interface of the public stewardship entity network portal application selecting a geographic location and selecting a geographic scale;
   presenting a wireless communication network status map by the public stewardship entity network portal application based on the operations data, where the wireless communication network status map indicates an operating status of cell sites among the plurality of cell sites in the wireless communication network that are located in an area defined by the selected geographic location and the selected geographic scale;

receiving an input by the public stewardship entity network portal application from the user interface of the public stewardship entity network portal application selecting an event type mapping overlay;

retrieving event information by the public stewardship entity network portal application from a web server associated with the selected event type mapping overlay;

presenting event information by the public stewardship entity network portal application overlaid on the wireless communication network status map according to the input geographic scale and input geographic location;

receiving an input by the public stewardship entity network portal application from the user interface of the public stewardship entity network portal application identifying a location of a public stewardship event;

determining by the public stewardship entity network portal application based on the operations data that wireless communication service of at least one cell site proximate to the location of the public stewardship event is impaired; and based on the determination that wireless communication service of at least one cell site proximate to the location of the public stewardship event is impaired, uplifting by the public stewardship entity network portal application a priority of mobile communication devices of public stewardship workers dispatched to respond to the public stewardship event such that the mobile communication devices of the public stewardship workers dispatched to respond to the public stewardship event are provided a wireless communication link while at the location of the public stewardship event.

2. The method of claim 1, wherein uplifting the priority of mobile communication devices comprises sending a command by the public stewardship entity network portal application to a provisioning server of a wireless communication service provider, whereby the provisioning server configures at least one cell site to grant higher priority for allocation of a wireless communication link to the uplifted mobile communication devices.

3. The method of claim 1, wherein uplifting the priority of mobile communication devices comprises sending a command by the public stewardship entity network portal application to a provisioning server of a wireless communication service provider, whereby the provisioning server configures at least one cell site to provide a predefined quality of service (QoS) to the uplifted mobile communication devices.

4. The method of claim 1, wherein each of the mobile communication devices is a cell phone, a mobile phone, a smart phone, an Internet of things (IoT) device, a personal digital assistant (PDA), a wearable computer, a headset computer, a laptop computer, a notebook computer, or a tablet computer.

5. The method of claim 1, wherein the cell sites establish wireless communication links with the mobile communication devices by at least one of a 5G, a long term evolution (LTE), a code division multiple access (CDMA), or a global system for mobile communications (GSM) telecommunications protocol.

6. The method of claim 1, wherein the operating status of cell sites is indicated as one of working as designed or impaired service.

7. The method of claim 1, wherein the public stewardship workers are one of a fire fighter, a paramedic, an ambulance crew member, a policeman, a forest service member, a member of the coast guard, a member of the national guard, or a military service member.

8. The method of claim 1, wherein the event type mapping overlay is one of a fire event overlay, a fire danger event overlay, a red flag danger event overlay, a flooding event overlay, a high wind event overlay, an electric power distribution outage event overlay, a severe weather damage event overlay, a dense fog event overlay, a freeze warning event overlay, or a blizzard event overlay.

9. A method of monitoring a wireless communication network and controlling wireless frequencies used by mobile communication devices of public stewardship workers, comprising:

receiving operations data by a public stewardship entity network portal application executing on a computer system, where the operations data is about a plurality of cell sites in a wireless communication network;

receiving an input by the public stewardship entity network portal application from a user interface of the public stewardship entity network portal application selecting a geographic location and selecting a geographic scale;

presenting a wireless communication network status map by the public stewardship entity network portal application based on the operations data, where the wireless communication network status map indicates an operating status of cell sites among the plurality of cell sites in the wireless communication network that are located in an area defined by the selected geographic location and the selected geographic scale;

receiving an input by the public stewardship entity network portal application from the user interface of the public stewardship entity network portal application selecting an event type mapping overlay;

retrieving event information by the public stewardship entity network portal application from a web server associated with the selected event type mapping overlay;

presenting event information by the public stewardship entity network portal application overlaid on the wireless communication network status map according to the input geographic scale and input geographic location, wherein the wireless communication network status map overlaid with the event information indicates the operating status of the cell sites in the wireless communication network that are located in the area defined by the selected geographic location and the selected geographic scale and indicates the event information associated with the area defined by the selected geographic location and the selected geographic scale;

determining a preferred wireless communication frequency band by the public stewardship entity network portal application based on the operations data of some of the plurality of cell sites and based on the event information; and transmitting a command to communicate using the preferred wireless communication frequency band by the public stewardship entity network portal application to at least one mobile communication device associated with a public stewardship worker.

10. The method of claim 9, comprising:

determining a preferred telecommunications protocol by the public stewardship entity network portal application based on the operations data of some of the plurality of cell sites and based on the event information; and transmitting a command to communicate using the preferred telecommunications protocol by the public stewardship entity network portal application to at least one mobile communication device associated with a public stewardship worker.

11. The method of claim 10, where the preferred telecommunications protocol is one of a 5G, a long term evolution (LTE), a code division multiple access (CDMA), or a global system for mobile communications (GSM) telecommunications protocol.

12. The method of claim 9, wherein the input selecting a geographic location comprises a latitude longitude coordinate, a GPS coordinate, a postal zip-code, or a postal address.

13. The method of claim 9, wherein the input selecting a geographic scale comprises a nationwide geographic scale, a statewide geographic scale, or a countywide geographic scale.

14. The method of claim 9, wherein the input selecting a geographic scale comprises an input from an electric pen or from a mouse, whereby a user is able to define an area by drawing the area.

15. A method of monitoring a wireless communication network used by mobile communication devices of public stewardship workers, comprising:
  receiving data about a plurality of cell sites in a wireless communication network by a public stewardship entity network portal application executing on a computer system;
  receiving an input by the public stewardship entity network portal application from a user interface of the public stewardship entity network portal application selecting a geographic location and selecting a geographic scale;
  adapting the data about cell sites located within an area defined by the selected geographic location and the selected geographic scale by the public stewardship entity network portal application to make the adapted data meaningful to a public stewardship dispatcher;
  presenting a wireless communication network status map by the public stewardship entity network portal application based on the adapted data, where the wireless communication network status map indicates an operating status of cell sites located within the area defined by the selected geographic location and the selected geographic scale;
  receiving an input by the public stewardship entity network portal application from the user interface of the public stewardship entity network portal application selecting an event type mapping overlay;
  retrieving event information by the public stewardship entity network portal application from a web server associated with the selected event type mapping overlay; and
  presenting event information associated with the area defined by the selected geographic location and the selected geographic scale by the public stewardship entity network portal application overlaid on the wireless communication network status map, wherein the wireless communication network status map overlaid with the event information indicates the operating status of the cell sites located in the area defined by the selected geographic location and the selected geographic scale and indicates the event information associated with the area defined by the selected geographic location and the selected geographic scale.

16. The method of claim 14, wherein the public stewardship entity network portal application receives the data about the plurality of cell sites from an operational support system (OSS).

17. The method of claim 14, wherein adapting the data about cell sites comprises analyzing the data received about the plurality of cell sites to categorize each cell site as being in one of an operating as designed status or an impaired service status.

18. The method of claim 14, wherein adapting the data about cell sites comprises analyzing the data received about the plurality of cell sites to categorize each cell site as being in one of an operating as designed status, an impaired service status, or an out-of-service status.

19. The method of claim 14, wherein the input selecting an event type mapping overlay is selects a fire event overlay, a fire danger event overlay, a red flag danger event overlay, a flooding event overlay, a high wind event overlay, an electric power distribution outage event overlay, a severe weather damage event overlay, a dense fog event overlay, a freeze warning event overlay, or a blizzard event overlay.

20. The method of claim 14, further comprising:
  receiving an input from the user interface of the public stewardship entity network portal application by the public stewardship entity network portal application, where the input defines a geographical area and requests an estimation of the likelihood an emergency message was delivered to mobile communication devices located within the defined geographical area;
  estimating by the public stewardship entity network portal application the likelihood the emergency message was delivered to mobile communication devices located within the defined geographical area; and
  presenting by the public stewardship entity network portal application the estimated likelihood in the user interface of the public stewardship entity network portal application, whereby a public stewardship worker is enabled to decide if there is a need to go door-to-door within the defined geographical area to convey the emergency message.

* * * * *